United States Patent [19]

Lein

[11] Patent Number: 4,906,024

[45] Date of Patent: Mar. 6, 1990

[54] FOLDABLE SHEET

[76] Inventor: Ulrich Lein, Walderstrasse 386, 4010 Hilden, Fed. Rep. of Germany

[21] Appl. No.: 197,256

[22] Filed: May 23, 1988

[30] Foreign Application Priority Data

May 23, 1987 [DE] Fed. Rep. of Germany ....... 8707414

[51] Int. Cl.$^4$ .............................................. B42D 19/00
[52] U.S. Cl. .......................................... 281/5; 281/2; 283/34
[58] Field of Search ................... 5/482, 487, 495, 502; 281/5, 2; 283/34

[56] References Cited

U.S. PATENT DOCUMENTS 2,572,460  10/1951  Falk ........................................ 281/5

FOREIGN PATENT DOCUMENTS 53062  4/1937  Denmark ................................. 281/5

Primary Examiner—Alexander Grosz
Attorney, Agent, or Firm—Fleit, Jacobson, Cohn, Price, Holman & Stern

[57] ABSTRACT

A foldable sheet of rectangular shape which can be folded by a plurality of folding edges intersecting at right-angles and by slits or slots which proceed from the center of the sides of a rectangular central portion which is surrounded by edge and corner foldable portions. In the unfolded state different foldable portions which belong partially to the front and partially to the back of the foldable sheet can be combined and to increase possible combinations, the central portion has between two opposing slits or slots folding edges intersecting at its center and one of the two folding edges of each corner foldable portion is cut to form a slit or slot, so that book-like folds can be formed in which the individual leaves can be combined by appropriate unfolding and refolding in varied ways.

14 Claims, 2 Drawing Sheets

FOLDABLE SHEET

BACKGROUND OF THE INVENTION

The invention relates to a rectangular foldable sheet of the type used for maps and advertising brochures, for example.

According to German Patent reference DE-GM No. 68 07 085, a foldable sheet of this type is provided in such a manner for a map printed on two sides with different scales that when the foldable sheet is completely opened, the entire map on the one scale is visible, whereas when the foldable portions are folded back onto the central portion which remains unfolded, the other map scale is visible. In the folded state, this map still shows a quarter of the surface area of its opened state. By partial folding, it is possible to form also a combination of the representation of the front with the representation of the back, such as, for example, in advertising brochures in which it is thus possible to combine a text with an image. The possible combinations using this foldable sheet are, however, limited.

Generally, foldable sheets are known in which at each unfolding along a folded edge the surface area is increased to twice the value. This results in unfoldings of large surface area which is not very practical especially in limited spaces, for example in a vehicle. In addition, when unfolding, in each case only one side of the sheet can be rendered visible. In the case of sheets printed on both sides, the unfolded sheet must be turned over completely in order to render the rear side visible.

In addition, there is the concertina type folding format in which a zig-zag-like folding of an elongate sheet of paper permits a space-saving folding up. In this case, however, it is disadvantageous that a pictorial representation must always extend in a preferred direction, to which principle cartographic accuracy must frequently give way, for example in the case of concertinas of the course of a river.

BRIEF SUMMARY OF THE INVENTION

It is an object of the invention to overcome the above problems of the prior art introduction, the problem underlying the invention is to and to provide a foldable sheet wherein the number of possible combinations of one unfolded foldable portion, or section, with the remaining foldable portions, or sections, is substantially increased. It is a further object of the invention to provide an improvement in foldable sheets used; especially for the presentation of displays, for example for advertising purposes, in which it is frequently a question of replacing parts of one display with other parts so that a changing pictorial impression can be achieved.

The invention achieves these objectives by providing a foldable sheet which, in the simplest case, can be folded up or completely opened by only four foldings. In the case of partial opening, while folding in the appropriate edge or corner foldable portions, or sections, it is possible to make combinations in a considerably increased number. In particular, the front and back of the foldable sheet can be strengthened so that a book-like folding up results in which, however, the individual leaves are not changed by opening but by appropriate unfolding and refolding. By reinforcing and indicating the front and back it is also possible to avoid errors in dividing when folding up and unfolding.

By the cutting according to the invention of, in each case, one of the two folding edges of the corner foldable portions, the latter remain connected by their remaining folding edges to an edge foldable portion about which they can, if necessary, be turned when folding up. This considerably increases clarity.

A very interesting development of the invention comprises the original rectangular format having at least at one of its edges a zig-zag-like folding, the foldable portions of which adjoin the corresponding edge and for their part are cut in extension of the cuts of the edge foldable portions. This results in a partially concertina-like foldable sheet so that display possibilities are provided even for very elongate subjects, relatively long texts, or the like.

To ensure folding up in the manner intended, advantageously two adjacent edge foldable portions are designed so that they are reinforced as front or back of a foldable stack. In particular, these foldable portions may have appropriate markings so that the correct method of folding up can be recognized by the user.

The foldable sheet according to the invention comprises at least 16 foldable portions, which are partially cut so that, the folding up may occasionally be rendered difficult. In this connection, effective assistance is offered to the user in that, according to a further feature of the invention, the design of the folding edges determines whether the adjacent foldable portions are to be foldable in one direction or in two directions. In order to achieve this, there are used in a defined manner reinforcing coatings which are frequently necessary in any case in order ensure the necessary stability or in order to be used as support for images or text.

These reinforcing coatings are formed in the region of the four foldable portions of the central part only at the two foldable portions lying on the outside when folded up, the foldable portions having in the folding edge a gap having such a spacing that the edges of the coating meet in the unfolded state. Unfolding in the backward direction is thus excluded. Likewise, the user is required thereby to fold firstly the non-reinforced foldable portions and only subsequently the coated foldable portions.

In contrast to the treated four foldable portions of the central portion, the remaining foldable portions are provided according to the invention with a reinforcing coating on both sides. In the region of the folding edges, these reinforcing coatings have spacings fron one another which correspond to twice their thickness. Thus, such foldable portions can be folded in two directions as a result of which, apart from the foldable portions of the front and back, in the opened state each foldable portion of the one side can be placed opposite each foldable portion of the other side, it being clear to the user whether he may make a fold in two directions or only in one direction. Mechanical damage to the reinforcing coatings is advantageously excluded by rounded edges of the latter.

In order, in the unfolded state, to be able to leave two opposing foldable portions, or sections, temporarily unaltered, unintentional foldings can be prevented if there are pushed onto the edges profiled bars of U-shaped cross-section which substantially bridge the folding edges of adjacent foldable portions.

BRIEF DESCRIPTION OF THE DRAWINGS

The invention will now be described in detail with; reference to the accompanying drawings relating to preferred embodiments wherein.

DETAILED DESCRIPTION

Figure 1:
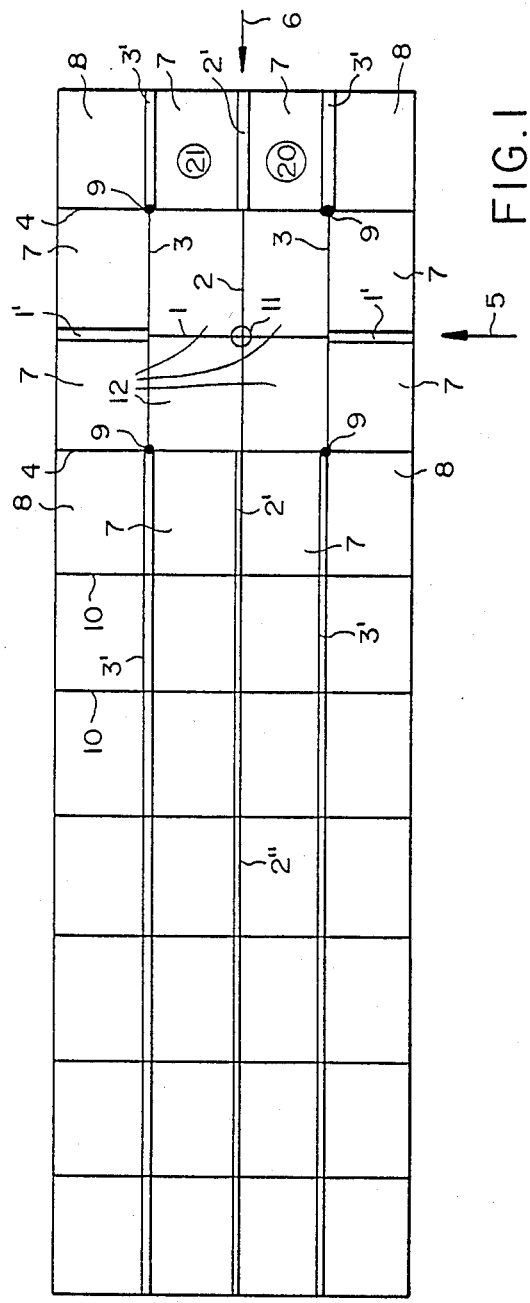
FIG. 1 is a plan view which shows a foldable sheet according to the invention in the fully unfolded state.

The elongate rectangular format shown in FIG. 1 shows folding edges in single lines and cut edges in double lines.

In accordance with the righthand portion of the drawing, there can be seen the two central folds 1 and 2 to be made first, which intersect one another at right-angles at point 11. They run in the directions 5 and 6. The adjacent central folds 3 and 4 lead to four points of intersection in the internal corners 9. The folding edges 1' and 2' extended into the edge regions are cut to form slits or slots. In addition, the folding edges 3 extended in the lefthand portion of the drawing corresponding to 3' are cut to form slits or slots. The cut folding edge 2' extended into the lefthand portion of the drawing is cut to form slit or slot 2" in the lefthand portion.

The central portion of the foldable sheet, which is formed by the foldable sections 12 adjacent the central point 11, is surrounded by the edge foldable sections 7 and the corner foldable sections 8. The two upper edge foldable sections 7 are each designed as front or back in order to form the base and cover when the foldable sheet is folded up. It can be seen in particular that the outer foldable sections in each case can be folded towards the middle, it being possible to fold up the horizontally adjacent foldable sections in the lefthand portion in zig-zag formation in the manner of a concertina. This results in a folded foldable sheet of a size equal to that of one foldable section. The individual foldable sections can be formed at the front or back by simple folding operations, as has been described. The zig-zag-like folding edges 10 are crossed, in the embodiment shown, by cut folding edges, or slit or slots 3'. It is also possible, however, to dispense with the cut at one of the folding edges 3' and, instead, to cut the adjacent folding edge 10 to the extent of one foldable section so that the zig-zag-like portion can be folded up completely or partially, which considerably increases ease of handling.

The edge foldable sections 7 on the right of the drawing are additionally designated 20,21. The foldable section 20 can be designed as the front and the foldable section 21 as the back of a foldable stack which, in the case of appropriate marking, can readily be formed in such a manner that it can be opened like a book because then, apart from the front and back, in the manner described each page can be combined with one half of the desired page of the other half.

Figure 2:
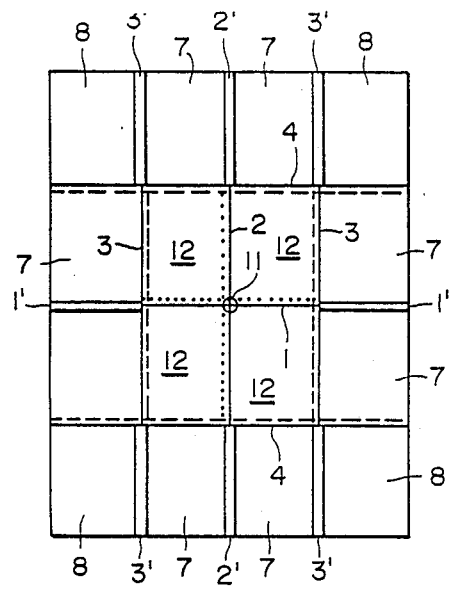
FIG. 2 is a plane view which shows a foldable sheet according to the invention indicating the directions of folding.

According to FIG. 2, the foldings are facilitated in that they can be made depending on direction. For this purpose, the righthand portion of FIG. 1 is shown in FIG. 2 only with regard to its folding edges. The strongly dotted lines indicate that the folding edges corresponding to them can be formed in only one direction, while the strongly dashed lines are to indicate that at these lines folding edges are possible in two directions. Accordingly, the folds possible in one direction are characteristic of the folding edges 1 and 2, whereas for the folding edges 3 and 4 the folds are to be made in two directions in order to be able to make the combinations mentioned.

Figure 3:
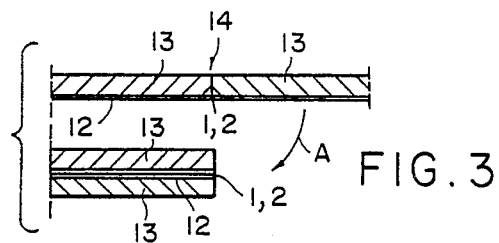
FIG. 3 is a cross-sectional view of a part of the foldable sheet of the invention having a single-sided reinforcing coating.

FIG. 3 shows the making of reinforcing coatings at the two foldable sections 12 which are connected either by the folding edges 1 or by the folding edges 2, as a result of which therefore they are to be foldable only in one direction. The reinforcing coatings 13 are, in this case, interrupted along the associated folding edge but in the extended state are designed virtually without gaps. As a result, folding is possible only in the direction of the curved arrow shown so that when folding an arrangement is achieved as can be seen in the lower portion of FIG. 3. The reinforcing coatings 13 accordingly gape open in the folded state and in the unfolded state, in contrast, they meet at 14.

Figure 4:
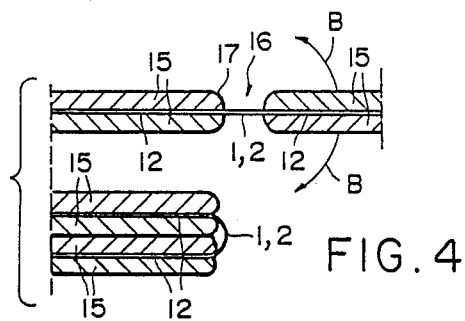
FIG. 4 is a view similar to FIG. 3 which shows a two-sided reinforcing coating.

The representation of FIG. 4 shows the double-sided reinforcing coating 15 with the formation of a gap 16 having a width twice the thickness of the reinforcing layers 15. This allows pivoting of the fold in the two directions of the curved arrows 13 so that in the folded up state corresponding to the lower portion of FIG. 4 the adjacent reinforcing coatings 15 can lie on top of one another while the substantially thinner material of the foldable sheet is turned through 180°.

The material for the foldable sheet on the one hand and for the reinforcing coating on the other hand can be freely selected within wide limits. For the manufacture of the foldable sheet itself, a flexible relatively thin material is necessary, while the material provided for the reinforcing coatings 13 and 15 can have the form of plates or slabs. It does not, in this case, necessarily need to be flexible. In order, during use, to exclude damage to the reinforcing coatings in the edge region, there are provided there, as FIG. 4 shows, rounded corner edges 17.

The foldable sections may also comprise transparent material, especially transparent foils, so that combinations are also possible in which several foldable sections lying on top of one another are visible. Appropriate transparent foils can also be added from the outside to the foldable sections for folding in.

The folding edges need not necessarily be formed from flexible material. In an analogous application of the invention, they may be formed also by piano hinges or by ring joints. The determining factor is the actual intended use of the foldable sheet according to the invention. If, for example, the foldable sections are formed from heavy plates, there would advantageously be provided as folding edges durable hinge joints.

Figure 5:
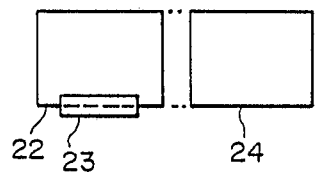
FIG. 5 is a plan view which shows adjacent foldable sections having a profiled piece.

Occasionally it is advantageous temporarily to fix the two halves of an unfolded foldable stack of sections in their position. A profiled piece 23 having a U-shaped cross-section serves for this purpose, which piece can, according to FIG. 5, be pushed to a position spanning the edges of two adjacent foldable sections in the manner of a bridge from one folding edge 22 of one half of the foldable stack onto the adjacent folding edge 24 of the associated half of the foldable stack.

I claim:

1. In a foldable sheet wherein a plurality of rectangular sections are connected together by folding edges between adjacent sections intersecting at right angles, a rectangular central portion is formed by a plurality of sections interconnected by folding edges intersecting at the center of the central portion perpendicular to each other, a plurality of side foldable sections and corner foldable sections surround the central portion, each side section having one side thereof connected to the adjacent side of the central portion by a folding edge and a second side thereof separated from a second side of the adjacent side section by a cut edge, each corner section being connected to third sides of adjacent side sections by two folding edges, the improvement wherein:
  one of said two folding edges of each corner section comprises a cut edge.

2. A folding sheet as claimed in claim 1 wherein:
said cut edges comprise slits.

3. A folding sheet as claimed in claim 1 wherein:
said cut edges comprise slots.

4. A folding sheet as claimed in claim 1 wherein said central portion and surrounding foldable sections comprise a main portion and further comprising:
  an extending portion extending laterally from a side of said main portion comprising a plurality of rectangular foldable sections connected together by folding edges on two opposite sides of adjacent sections and having cut edges between other adjacent foldable sections intersecting at right angles said folding edges connecting said foldable sections of said extending portion, said extending portion having an end group of foldable sections connected by folding edges to the side of said main portion from which said extending portion extends.

5. A folding sheet as claimed in claim 4 wherein:
said cut edges comprise slits.

6. A folding sheet as claimed in claim 4 wherein:
said cut edges comprise slots.

7. A folding sheet as claimed in claim 4 wherein:
one of said cut edges between other adjacent foldable sections of said extending portion comprises a continuation of one of said cut edges on said second sides of two adjacent side sections, and the other of said cut edges between adjacent foldable sections of said extending portion comprise continuations of said cut edges on two of said corner sections.

8. A folding sheet as claimed in claim 1 and further comprising:
  a reinforcing coating on one side of at least one of said foldable sections.

9. A folding sheet as claimed in claim 1 and further comprising:
  a reinforcing coating on the same side of at least two adjacent foldable sections; and
  adjacent edges on said reinforcing coating on said at least two adjacent foldable sections substantially aligned with the folding edge between said two adjacent foldable sections and substantially abutting when said at least two adjacent foldable sections are in an unfolded position.

10. A folding sheet as claimed in claim 9 wherein:
said at least two adjacent foldable sections having said reinforcing coating thereon comprise two foldable sections of said central portion forming outer cover sections when the foldable sheet is in the folded position.

11. A folding sheet as claimed in claim 1 and further comprising:
  a reinforcing coating on both sides of at least one of said foldable sections.

12. A foldable sheet as claimed in claim 11 wherein:
said reinforcing coating is on both sides of at least two adjacent foldable sections and have adjacent edges substantially parallel with the folding edge of said adjacent sections spaced apart a distance substantially equal to twice the thickness of said reinforcing coating.

13. A folding sheet as claimed in claim 12 wherein:
said adjacent edges of said reinforcing coatings comprise rounded edges.

14. A folding sheet as claimed in claim 1 and further comprising:
  a profiled retaining member having a U-shaped cross section removably and simultaneously engageable with aligned edges of adjacent foldable sections when in an at least partially unfolded position and extending across a folding edge of said adjacent foldable sections for retaining said adjacent foldable sections in the unfolded position.

* * * * *